US011897097B1

(12) United States Patent
Johnson et al.

(10) Patent No.: US 11,897,097 B1
(45) Date of Patent: Feb. 13, 2024

(54) ROTOR BIT EXTRACTION TOOL WITH A LIGHTING UNIT

(71) Applicant: Caterpillar Paving Products Inc., Brooklyn Park, MN (US)

(72) Inventors: Nicholas Bernard Johnson, Dayton, MN (US); Matthew-David S. Frantz, Eden Prairie, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 0 days.

(21) Appl. No.: 17/819,643

(22) Filed: Aug. 15, 2022

(51) Int. Cl.

| | |
|---|---|
| ***E01C 23/12*** | (2006.01) |
| ***E01C 23/088*** | (2006.01) |
| ***E21C 35/18*** | (2006.01) |
| ***B25B 27/02*** | (2006.01) |
| ***B28D 1/18*** | (2006.01) |

(52) U.S. Cl.
CPC ............ *B25B 27/026* (2013.01); *B28D 1/188* (2013.01); *E01C 23/088* (2013.01); *E01C 23/127* (2013.01); *E21C 35/188* (2020.05)

(58) Field of Classification Search
CPC ..... E21C 35/188; B25B 27/026; B28D 1/188; E01C 23/088; E01C 23/127
See application file for complete search history.

(56) References Cited

U.S. PATENT DOCUMENTS

| | | | | |
|---|---|---|---|---|
| 4,329,766 | A * | 5/1982 | Leonard | E02F 9/2891 299/95 |
| 5,954,458 | A | 9/1999 | Lee | |
| 7,891,084 | B1 * | 2/2011 | Sollami | E02F 9/2866 29/760 |
| 9,328,915 | B2 | 5/2016 | Vanko et al. | |
| 9,539,691 | B2 | 1/2017 | Hirschburger | |
| 11,203,103 | B2 | 12/2021 | Sansone et al. | |
| 2018/0161951 | A1 * | 6/2018 | Billings | F21V 21/00 |
| 2019/0366521 | A1 * | 12/2019 | Sansone | B25B 27/026 |

FOREIGN PATENT DOCUMENTS

| | | | | |
|---|---|---|---|---|
| EP | 1167626 | A1 * | 1/2002 | E01C 23/088 |

* cited by examiner

*Primary Examiner* — Janine M Kreck

(57) ABSTRACT

A tool, for removing a cutting bit from a rotor of a rotor assembly of a machine, includes one or more input interfaces and one or more lighting units. The one or more input interfaces are configured to be actuated to perform one or more functions associated with removing the cutting bit from the rotor. The one or more lighting units are configured to be activated upon the actuation of the one or more input interfaces to illuminate at least a portion of the rotor assembly when performing the one or more functions associated with removing the cutting bit from the rotor.

17 Claims, 4 Drawing Sheets

ROTOR BIT EXTRACTION TOOL WITH A LIGHTING UNIT

TECHNICAL FIELD

The present disclosure relates to construction machines having rotors with cutting bits disposed thereon for performing one or more of scarifying, removing, or reclaiming material from ground surfaces. More particularly, the present disclosure relates to a tool for extracting the cutting bits from rotors of construction machines.

BACKGROUND

Milling machines, such as cold planers (also known as road mills or profilers), are generally used to process (e.g., scarify, remove, reclaim, etc.) material from ground surfaces (e.g., a roadway, parking lots, etc.). A milling machine typically includes a rotor and a mixing chamber that defines a housing for the rotor. The rotor includes multiple cutting bits removably mounted onto the rotor. As the rotor spins and is lowered, the cutting bits of the rotor may be brought into contact with the ground surface to break up and pulverize one or more layers of materials from the ground surface.

During usage, the cutting bits may encounter heavy loading and/or highly abrasive conditions. These conditions may cause the cutting bits to wear out or fail over a period. Therefore, these cutting bits may require replacement. Replacing such cutting bits requires an operator to work in a constrained and dimly lit (or dark) area within and/or in the vicinity of the mixing chamber.

SUMMARY OF THE INVENTION

In an aspect, the present disclosure relates to a tool for removing a cutting bit from a rotor of a rotor assembly of a machine. The tool includes one or more input interfaces and one or more lighting units. The one or more input interfaces are configured to be actuated to perform one or more functions associated with removing the cutting bit from the rotor. The one or more lighting units are configured to be activated upon the actuation of the one or more input interfaces to illuminate at least a portion of the rotor assembly when performing the one or more functions associated with removing the cutting bit from the rotor.

In another aspect, the present disclosure is directed to a tool system for a machine having a rotor assembly including a rotor and a plurality of cutting bits mounted to the rotor. The tool system includes a tool for removing a selected cutting bit of the plurality of cutting bits from the rotor, and a controller. The tool includes one or more input interfaces and one or more lighting units. The one or more input interfaces are configured to be actuated to perform one or more functions associated with removing the selected cutting bit from the rotor. The one or more lighting units are configured to be activated upon the actuation of the one or more input interfaces to illuminate at least a portion of the rotor assembly when performing the one or more functions associated with removing the selected cutting bit from the rotor. Further, the controller is configured to: receive one or more input signals correspondingly upon the actuation of the one or more input interfaces; and control, in response to the one or more input signals, a supply of electric power from an electrical power supply source of the machine to the one or more lighting units to activate the one or more lighting units.

In yet another aspect, the present disclosure relates to a machine. The machine includes a milling chamber, a rotor assembly, and a tool system. The rotor assembly is housed within the milling chamber. Further, the rotor assembly includes a rotor and a plurality of cutting bits to mill a ground surface beneath the machine. The tool system includes a tool for removing a selected cutting bit of the plurality of cutting bits from the rotor, and a controller. The tool includes one or more input interfaces and one or more lighting units. The one or more input interfaces are configured to be actuated to perform one or more functions associated with removing the selected cutting bit from the rotor. The one or more lighting units are configured to be activated upon the actuation of the one or more input interfaces to illuminate at least a portion of the rotor assembly when performing the one or more functions associated with removing the selected cutting bit from the rotor. Further, the controller is configured to: receive one or more input signals correspondingly upon the actuation of the one or more input interfaces; and control, in response to the one or more input signals, a supply of electric power from an electrical power supply source of the machine to the one or more lighting units to activate the one or more lighting units.

DETAILED DESCRIPTION

Reference will now be made in detail to specific embodiments or features, examples of which are illustrated in the accompanying drawings. Generally, corresponding reference numbers may be used throughout the drawings to refer to the same or corresponding parts, e.g., 1, 1', 1", 101 and 201 could refer to one or more comparable components used in the same and/or different depicted embodiments.

Figure 1:
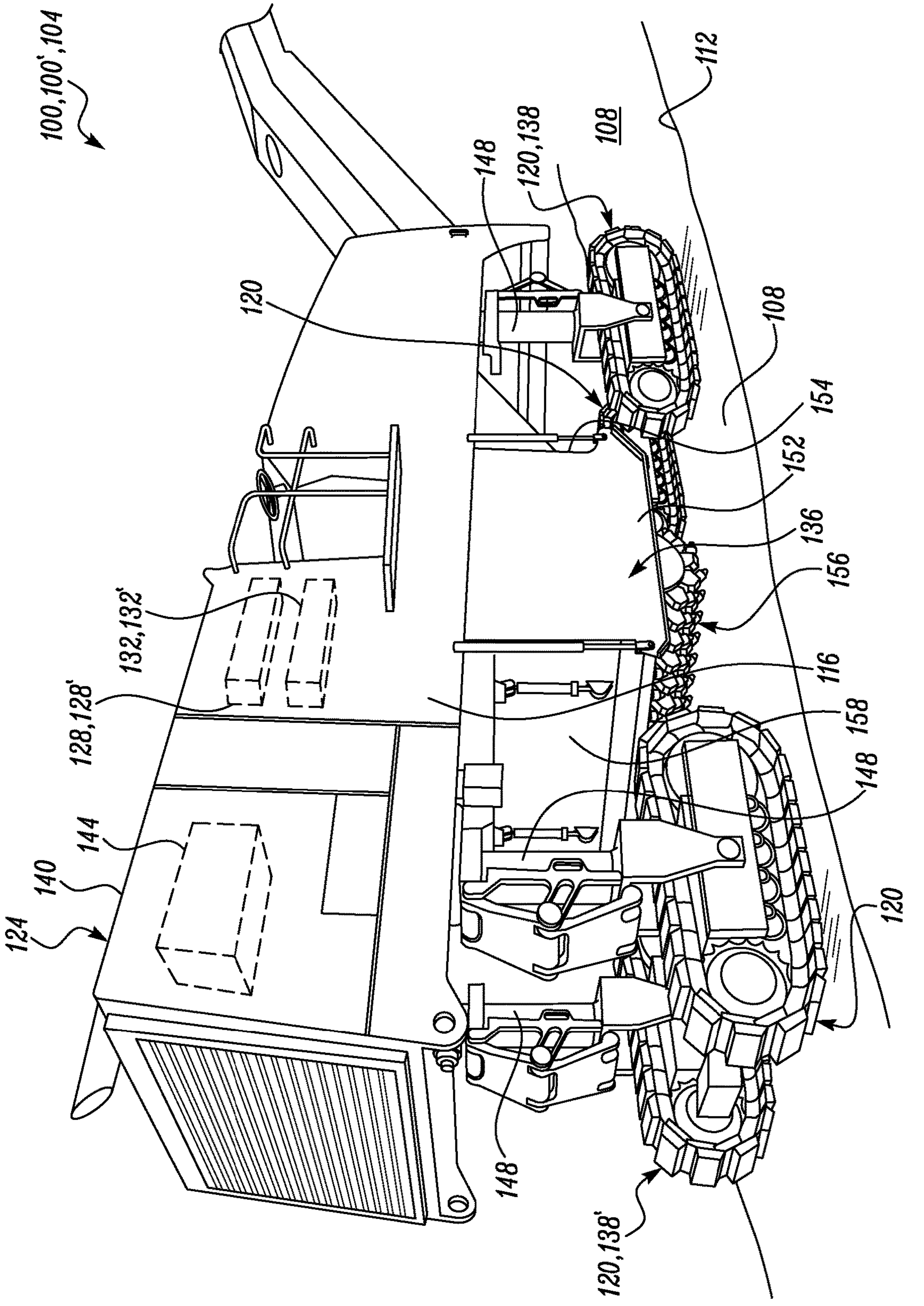
FIG. 1 is a perspective view of the rear and one side of an exemplary machine having a rotor assembly with a rotor and a number of cutting bits mounted to the rotor, in accordance with an embodiment of the present disclosure.

Referring to FIG. 1, an exemplary machine 100 (hereinafter referred to as "machine 100") is shown. The machine 100 may include a roadway/pavement profiler, a roadway planer, or a milling machine 100'. As an example, the milling machine 100' includes a cold planer 104. The machine 100 may be used to perform a milling operation to modify (e.g., mill) a ground surface 108 beneath the machine 100. In an example, the milling operation may mean or include scarifying, removing, mixing, and/or reclaiming material, from the ground surface 108. The ground surface 108 may be a worn-out surface of a roadway 112, formed from one or more of asphalt, bitumen, concrete, and/or other road surface materials.

The machine 100 may include a frame 116, a set of traction devices 120, a propulsion system 124, an electrical power supply source 128, a hydraulic power source 132, and a milling assembly 136. The frame 116 may accommodate and/or support the propulsion system 124, the electrical power supply source 128, the hydraulic power source 132, and the milling assembly 136, although other systems and/or components may be supported by the frame 116, as well.

The set of traction devices 120 may support the frame 116 (and thus the overall machine 100) over the ground surface 108 and may be powered by the propulsion system 124 so as to facilitate movement of the machine 100 over an expanse of the roadway 112. The traction devices 120 may include tracks and/or wheels and/or a combination thereof. Exemplarily, the machine 100 may include four traction devices 120 (one at each corner of the frame 116 of the machine 100), although lesser or higher number of traction devices 120 may be contemplated. One set of traction devices (e.g., forward traction devices 138) may be positioned towards a forward end of the machine, while another set of traction devices (e.g., rearward traction devices 138') may be positioned towards a rearward end of the machine.

The propulsion system 124 may include a power source 144. The power source 144 may be housed within a power compartment 140 of the machine 100. The power source 144 may include a combustion engine and/or an electrical power source. The power source 144 may be configured to generate an output power required to operate various systems or loads on the machine 100, with one operation exemplarily involving a powering of the traction devices 120 such that the machine 100 may be moved over the roadway 112.

The electrical power supply source 128 may include a battery pack 128'. The electrical power supply source 128 may be configured to store electric power, which may be supplied to various electrical systems or loads (not shown) associated with the machine 100. As an example, the battery pack 128' may include a single battery, although the battery pack 128' may represent and/or include multiple batteries. The electrical systems or loads may include, but need not be limited to, a Heating Ventilation Air Conditioning (HVAC) unit, or an engine starter motor. In some embodiments, the electrical power supply source 128 may include an alternator coupled to the engine 144 and may be configured to generate the electric power when driven by the engine 144, possibly together with battery pack 128'.

The hydraulic power source 132 may include one or more hydraulic pumps 132' configured to generate and supply fluid to one or more hydraulic systems or loads of the machine 100. It should be noted that, in some embodiments, the hydraulic power source 132 may also include one or more hydraulic valves that may be configured to direct supply of fluid from a single hydraulic pump 132' to multiple hydraulic systems or loads. The hydraulic systems or loads of the machine 100 may include, but need not be limited to, a hydraulic motor (not shown) associated with the milling assembly 136, or hydraulic motors (not shown) associated with the traction devices 120, or hydraulic legs 148 of the machine 100. In the exemplary embodiment, the hydraulic power source 132 includes a first hydraulic pump 134 (please see FIG. 2) configured to power the milling assembly 136 of the machine 100.

The milling assembly 136 may be supported by the frame 116 and may be configured to facilitate the milling operation. The milling assembly 136 may include a milling chamber 152 and a rotor assembly 156. The milling chamber 152 may be formed by forward and aft walls 154, 158, and/or gates of the milling assembly 136, and the same may be supported on and/or be suspended under the frame 116 of the machine 100. As exemplarily shown, the milling assembly 136, generally as a whole, acquires a position under the frame 116 of the machine 100, in between the forward and rearward traction devices 120 of the machine 100. The position of the milling chamber 152 may define a constrained area of the machine 100, making it cumbersome and arduous for an operator to access one or more components located within and/or around the milling chamber 152. Moreover, such a position can cause the milling chamber 152 and the components therein to receive inadequate lighting (e.g., natural and/or ambient lighting), thus making one or more parts and portions within and/or around the milling chamber 152 dimly lit, in turn making visibility and perception of those parts and portions a challenge.

Figure 2:
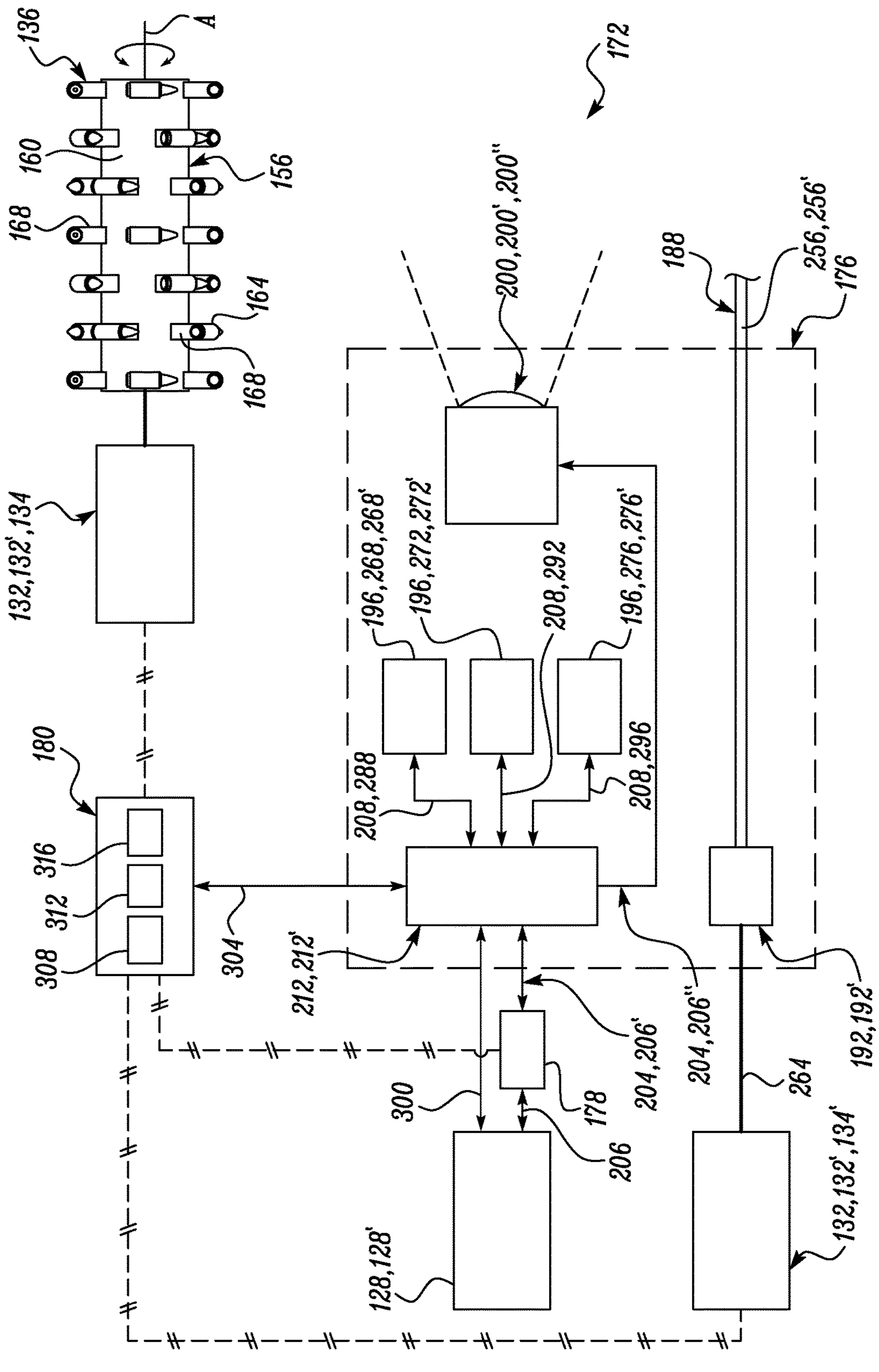
FIG. 2 illustrates in schematic form an exemplary tool system applicable for removing one or more of the cutting bits from the rotor, in accordance with an embodiment of the present disclosure.
Figure 4:
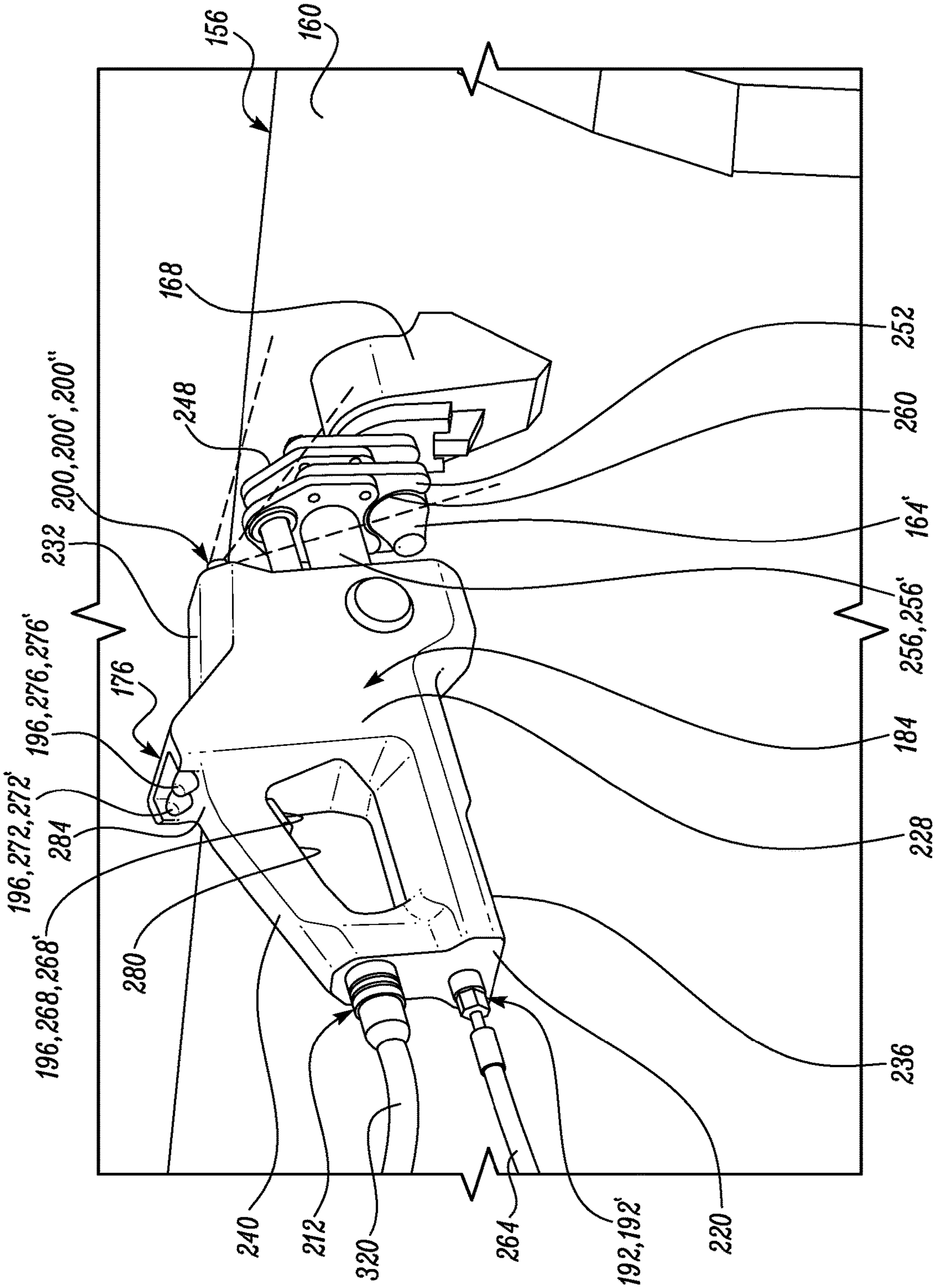
FIG. 4 illustrates the tool in an exemplary application during which a cutting bit from the rotor is removed, in accordance with an embodiment of the present disclosure.

The rotor assembly 156 may be housed within the milling chamber 152 and may thus correspond to a part or a portion of the machine 100 which is generally devoid of the adequate lighting and thus may be part of a dimly lit region of the machine 100. The rotor assembly 156 may include a rotor 160 (e.g., a cylindrical drum portion) and multiple cutting bits 164 removably mounted to the rotor 160 (please see FIG. 2). In the present embodiment, as shown in FIGS. 2 and 4, each cutting bit 164 is coupled to a corresponding bit holder 168 arranged on the rotor 160. Further the cutting bits 164 are arranged over and around the rotor 160.

During a milling operation, the rotor assembly 156 may be powered (e.g., hydraulically) to rotate (e.g., about a drum axis 'A', please see FIG. 2). While rotating, the rotor assembly 156 may be lowered to enable the cutting bits 164 to contact the ground surface 108. In so doing, the cutting bits 164 may grind and scrape off a top of the ground surface 108 or one or more layers of the ground surface 108. In so doing, the removable cutting bits 164 may wear out or fail over a period, and therefore, require replacement.

Referring to FIG. 2, one or more aspects of the present disclosure relates to a tool system 172 for the machine 100. The tool system 172 includes a tool 176 and a controller 180. In addition, the tool system 172 may include a timer 178. The tool system 172 facilitates illumination of at least a portion of the rotor assembly 156 when a removal of the cutting bit 164' from the rotor 160 is being performed close to or at regions inside the milling chamber 152, which may be constrained and/or dimly lit. In so doing, the tool system 172 (or the tool 176 of the tool system 172) may facilitate or assist with removing the cutting bit 164' efficiently, safely, and conveniently from the rotor 160. Details related to each of the tool 176, the timer 178, and the controller 180 are provided below.

Figure 3:
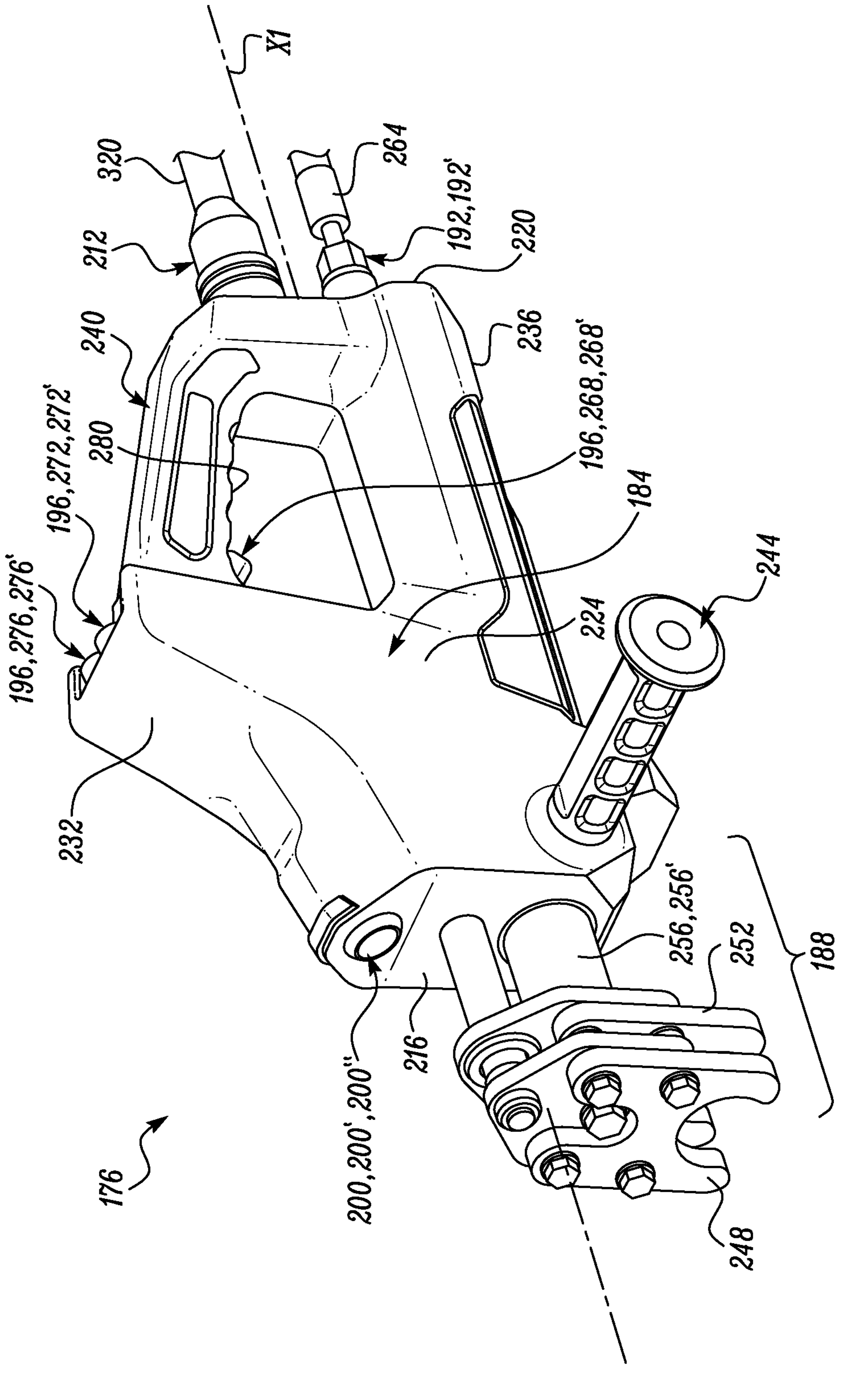
FIG. 3 illustrates a perspective view of a front and one side of an exemplary tool of the tool system, in accordance with an embodiment of the present disclosure.

Referring to FIGS. 2, 3, and 4, the tool 176 is discussed. The tool 176 is configured to facilitate removal of the cutting bit 164' from the rotor 160. The tool 176 includes a body 184, an extraction mechanism 188, and a first coupling 192. Also, the tool 176 includes one or more input interfaces 196, one or more lighting units 200. Additionally, or optionally, the tool 176 may further include a first communication line 204, one or more second communication lines 208, and a second coupling 212.

The body 184 may be configured to accommodate and support the extraction mechanism 188, the first coupling 192, the one or more input interfaces 196, the one or more lighting units 200, the first communication line 204, the one or more second communication lines 208, and the second coupling 212, although other known components may be accommodated within or supported by the body 184, as well. The body 184 may define a longitudinal axis 'X1' (see FIG. 3). Also, the body 184 may define a front-end portion 216, a rear-end portion 220, a first side portion 224, a second side portion 228 (as shown in FIG. 4), a top portion 232, and a bottom portion 236. Positional descriptors such as "front", "rear", "top", "bottom" and "side" reflect the depicted orientation of the body 184, and it will be appreciated that if the body 184 is repositioned, the descriptors may be changed accordingly.

The rear-end portion 220 may be disposed opposite to and axially spaced apart from the front-end portion 216 along the longitudinal axis 'X1'. Each of the first side portion 224 and the second side portion 228 may be located transversely relative to the longitudinal axis 'X1'. In addition, the first side portion 224 may be disposed opposite and spaced apart from the second side portion 228. Also, each of the first side portion 224 and the second side portion 228 may extend between the front-end portion 216 and the rear-end portion 220 to connect the front-end portion 216 with the rear-end portion 220. Further, each of the top portion 232 and the bottom portion 236 may be located transversely relative to the longitudinal axis 'X1' In addition, the top portion 232 may be disposed opposite and spaced apart from the bottom portion 236. Also, each of the first side portion 224 and the second side portion 228 may extend between the top portion 232 and the bottom portion 236 to connect the top portion 232 and the bottom portion 236.

Further, the body 184 defines a first handle portion 240 and a second handle portion 244. The first handle portion 240 may extend between the rear-end portion 220 and the top portion 232. The second handle portion 244 may extend outwardly away from the first side portion 224. The second handle portion 244 may have a substantially circular cross-section. In an exemplary scenario of operating the tool 176 shown in FIGS. 3 and 4, the operator may hold the tool 176 by gripping the first handle portion 240 with his/her right hand and gripping the second handle portion 244 with his/her left hand. The configuration of the tool 176 (as shown in FIGS. 3 and 4) is intended for use by a right-handed operator. However, it should be noted that the location of the second handle portion 244 could be mirrored left-to-right (i.e., the second handle portion 244 may be disposed and extend outwardly away from the second side portion 228), if desired, to enable a left-handed operator to use the tool 176. In some embodiments, second handle portion 244 could be attached to the first side portion 224 or the second side portion 228 in a removable manner, e.g., with threads on the second handle portion 244 that engage matching threads of the first side portion 224 and matching threads of the second side portion 228. This way only a single second handle portion 244 is needed for device operation by both right- and left-handed users. It should be noted that the details of the body 184, as described above, are purely exemplary, are provided for illustrative purposes, and hence, need not be seen as limiting the aspects of the present disclosure in any way.

The extraction mechanism 188 is now discussed. The extraction mechanism 188 facilitates extraction of the cutting bit 164' from the rotor 160. The extraction mechanism 188 may be powered by at least one power source (e.g., hydraulic, electrical, etc.) of the machine 100. In the illustrated embodiment of FIG. 2, the extraction mechanism 188 may be powered by a second hydraulic pump 134' (or an associated hydraulic valve) of the hydraulic power source 132 of the machine 100. The extraction mechanism 188 may include a first jaw 248, a second jaw 252, and an actuator 256. Details related to each of the first jaw 248, the second jaw 252, and the actuator 256 will now be discussed.

The first jaw 248 may be fixedly connected to the body 184 of the tool 176. The first jaw 248 may be configured to be engaged with the rotor 160. In the present embodiment, the first jaw 248 may be configured to be engaged with the bit holder 168 associated with the cutting bit 164'. In an example, and as shown in FIG. 4, the first jaw 248 includes an arcuate bracket that may engage with a neck portion (not shown) of the bit holder 168. The second jaw 252 may be configured to be engaged with the cutting bit 164' to be removed. In an example, and as shown in FIG. 4, the second jaw 252 includes an arcuate bracket that may fit and engage partially around a flange 260 of the cutting bit 164'.

The actuator 256 may be operatively coupled to the second jaw 252. The actuator 256 may be configured to displace the second jaw 252 relative to the first jaw 248 to extract the cutting bit 164' from the bit holder 168 (or from the rotor 160). In an example, the actuator 256 is configured to move the second jaw 252 away from the first jaw 248 in a direction parallel to the longitudinal axis 'X1', to extract the cutting bit 164' from the bit holder 168 (or from the rotor 160).

In the present exemplary embodiment, the actuator 256 includes a hydraulic piston and cylinder arrangement 256' configured to be powered by the hydraulic power source 132 of the machine 100 to move the second jaw 252 between a first, or spring biased, position, as shown in FIG. 3, and a second, or actuated, position (not shown). The hydraulic power source 132 (or the second hydraulic pump 134') may operate in a manner to draw the fluid from the hydraulic piston and cylinder arrangement 256' to cause the second jaw 252 to move from the first, or spring biased, position towards the second, actuated position. The movement of the second jaw 252 towards the second, actuated position (i.e., away from the first jaw 248) may result in the extraction of the cutting bit 164' from the bit holder 168. In some embodiments, the actuator 256 may be a pneumatically, or electrically, powered actuator.

The first coupling 192 may be configured to operatively connect the actuator 256 (of the extraction mechanism 188) to the at least one power source of the machine 100. In the present exemplary embodiment, the first coupling 192 may be a hydraulic connector 192' configured to fluidly connect, via a hydraulic hose 264, the actuator 256 to the hydraulic power source 132 of the machine 100 to cause the actuator 256 to move the second jaw 252 relative to the first jaw 248 to remove the cutting bit 164'. The hydraulic connector 192' may be disposed at the rear-end portion 220 of the body 184 (of the tool 176). It should be noted that, in other embodiments, the first coupling 192 may be any suitable coupling (e.g., electrical, pneumatic, etc.) now known or in the future developed and which is configured to connect the actuator to the suitable power source (e.g., hydraulic, or pneumatic, or electric, etc.) of the machine 100.

The input interfaces 196 may be configured to be actuated to perform one or more functions associated with the removal of the cutting bit 164' from the rotor 160. In the present embodiment, the tool 176 includes three input interfaces 196, i.e., —a first input interface 268, a second input interface 272, and a third input interface 276. However, in other embodiments, the tool 176 may include a higher or lesser number of input interfaces 196 that may be configured to be actuated to perform multiple functions associated with the removal of the cutting bit 164' from the rotor 160.

The first input interface 268 may include a trigger button 268'. The first input interface 268 (or the trigger button 268') may be positioned on the first handle portion 240. In the illustrated embodiment, the first input interface 268 (or the trigger button 268') is positioned at a lower surface 280 of the first handle portion 240. The first input interface 268 may be configured to be actuated to perform a first function of the one or more functions. The first function may correspond to the extraction of the cutting bit 164' from the rotor 160. In an exemplary embodiment, when the tool 176 is properly positioned relative to the cutting bit 164' to be removed, upon actuation, the first input interface 268 causes the actuator 256 (of the extraction mechanism 188) to displace the second jaw 252 relative to the first jaw 248 in a manner to extract the cutting bit 164' from the bit holder 168 of the rotor 160.

The second input interface 272 may include a trigger button 272'. The second input interface 272 (or the trigger button 272') may be positioned on the first handle portion 240. In the illustrated embodiment, the second input interface 272 (or the trigger button 272') is positioned at an upper surface 284 of the first handle portion 240. The second input interface 272 may be configured to be actuated to perform a second function of the one or more functions. In the present embodiment, the second function corresponds to a clockwise rotation of the rotor 160 about the drum axis 'A'.

The third input interface 276 may include a trigger button 276'. The third input interface 276 (or the trigger button 276') may be positioned on the first handle portion 240. In the illustrated embodiment, the third input interface 276 (or the trigger button 276') is positioned at the upper surface 284 of the first handle portion 240. In addition, the third input interface 276 may be positioned adjacent to the second input interface 272. The third input interface 276 may be configured to be actuated to perform a third function of the one or more functions. In the present embodiment, the third function corresponds to a counterclockwise rotation of the rotor 160 about the drum axis 'A'.

The input interfaces 196 may be operatively connected to the electrical power supply source 132 of the machine 100 and the controller 180, via the second communication lines 208. The second communication lines 208 may include three second communication lines 208, i.e., —a second communication line 288, a second communication line 292, and a second communication line 296. As shown in the illustrated embodiment of FIG. 2, the second communication line 288 connects the first input interface 268 to the electrical power supply source 132 and the controller 180, the second communication line 292 connects the second input interface 272 to the electrical power supply source 132 and the controller 180, and the second communication line 296 connects the third input interface 276 to the electrical power supply source 132 and the controller 180.

The second communication lines 208 facilitate a supply of one or more input signals to the controller 180 to cause the controller 180 to facilitate the corresponding function of the one or more functions associated with the removal of the cutting bit 164'. The input signals may be generated upon the actuation of the associated input interfaces 196. In an example, the second communication line 288 facilitates a supply of a first input signal, generated upon the actuation of the first input interface 268, to the controller 180 to cause the controller 180 to facilitate the extraction of the cutting bit 164' from the rotor 160 (first function). In another example, the second communication line 292 facilitates a supply of a second input signal, generated upon the actuation of the second input interface 272, to the controller 180 to cause the controller 180 to facilitate the clockwise rotation of the rotor 160 (second function). In yet another example, the second communication line 296 facilitates a supply of a third input signal, generated upon the actuation of the third input interface 276, to the controller 180 to cause the controller 180 to facilitate the counterclockwise rotation of the rotor 160 (third function).

The second communication lines 208 may connect the input interfaces 196 to the electrical power supply source 128 and the controller 180 via the second coupling 212. The second coupling 212 may receive one or more third communication lines 300 from the electrical power supply source 128 and one or more fourth communication lines 304 from the controller 180. Further, the second coupling 212 may facilitate an electrical connection (or disconnection) of the tool 176 with the electrical power supply source 128 and the controller 180. In the present exemplary embodiment, the second coupling 212 includes a 12-pin electrical connector 212'.

The one or more lighting units 200 includes a lighting unit 200'. The lighting unit 200' may be disposed at the body 184 of the tool 176. As shown in the illustrated embodiment of FIG. 3, the lighting unit 200' is positioned at the front-end portion 216 of the body 184 and above the extraction mechanism 188 of the tool 176. From this position, the lighting unit 200' may emit light towards the rotor assembly 156 of the machine 100, when the operator performs the one or more functions associated with the removal of the cutting bit 164' from the rotor 160 (or the bit holder 168). It should be noted that the position of the lighting units 200 in the present disclosure is exemplary, and in other embodiments, the lighting unit 200' may be positioned at any suitable location on the body 184 of the tool 176 in order to emit light towards the rotor assembly 156 of the machine 100, when the operator performs the one or more functions associated with the removal of the cutting bit 164'.

The lighting unit 200' may be activated by receiving a supply of electric power from the electrical power supply source 128 (or the battery pack 128') of the machine 100. Further, the lighting unit 200' is configured to be activated upon the actuation of the one or more input interfaces 196. In the illustrated embodiment, the lighting unit 200' is configured to be activated upon the actuation of the at least one of the first input interface 268, the second input interface 272, and the third input interface 276. Upon actuation of the at least one of the first input interface 268, the second input interface 272, and the third input interface 276, the lighting unit 200' emits the light to illuminate at least a portion of the rotor assembly 156 including the cutting bit 164' to be removed and the associated bit holder 168, the first jaw 248, and the second jaw 252 (as shown in FIG. 4). By illuminating the portion of the rotor assembly 156, the lighting unit 200' may facilitate the operator to clearly identify and view the cutting bit 164' to be removed when performing the one or more functions associated with the removal of the cutting bit 164' from the rotor 160 (or the bit holder 168).

As shown in the illustrated embodiment of FIGS. 3 and 4, the lighting unit 200' may include a single light emitting diode (LED) 200". However, in some embodiments, it may be contemplated that the lighting unit 200' may include multiple light emitting diodes, for example, light emitting diodes arranged in an array pattern. Additionally, although it is shown in the illustrated embodiment of FIGS. 3 and 4 that the lighting unit 200' include the light emitting diode 200", it may be contemplated that the lighting unit 200' may include, but need not be limited to, at least one of an incandescent unit (e.g., a filament lamp, a halogen lamp), a fluorescent unit, a phosphorescent unit, a high-intensity discharge unit (e.g., a sodium vapor lamp, a mercury vapor lamp, and a metal halide lamp), a laser unit, a pyroluminescent unit, and a luminescent polymer unit.

The first communication line 204 may extend between the electrical power supply source 128 and the lighting unit 200'. In the illustrated embodiment of FIG. 2, the first communication line 204 includes a first power supply line 206, a second power supply line 206', and a third power supply line 206". The first power supply line 206 may extend between the electrical power supply source 128 and the timer 178, the second power supply line 206' may extend between the timer 178 and the second coupling 212, and the third power supply line 206" may extend between the second coupling 212 and the lighting unit 200'. In this manner, the first power supply line 206, the second power supply line 206', and the third power supply line 206" may be operatively connected to each other to form and cause the first communication line 204 to extend between the electrical power supply source 128 and the lighting unit 200'.

Further, the first communication line 204 may be configured to operatively connect the lighting unit 200' with the electrical power supply source 128 of the machine 100. Accordingly, the first communication line 204 facilitates the supply of electric power from the electrical power supply source 128 to the lighting unit 200' to cause the lighting unit 200' to activate and illuminate the rotor assembly 156 upon the actuation of the one or more input interfaces 196.

The timer 178 may be configured to measure an elapsed time accumulated from the actuation of the at least one input interface 196 of the one or more input interfaces 196. Also, the timer 178 is configured to communicate the measured elapsed time to the controller 180. Further, the timer 178 is configured to operate in two modes, i.e., —a first operating mode and a second operating mode. In the first operating mode, the timer 178 may prevent the supply of electric power from the electrical power supply source 128 to the lighting unit 200'. In the second operating mode, the timer 178 may permit the supply of electric power from the electrical power supply source 128 to the lighting unit 200'.

The controller 180 may be communicably coupled to the hydraulic power source 132 of the machine 100. For instance, the controller 180 may be communicably coupled to the first hydraulic pump 134 (of the hydraulic power source 132) to control the rotation of the rotor assembly 156 (of the milling assembly 136). Also, the controller 180 may be communicably coupled to the second hydraulic pump 134' (of the hydraulic power source 132) to operate the extraction mechanism 188 of the tool 176.

Further, the controller 180 may be communicably coupled to the first input interface 268, the second input interface 272, the third input interface 276, the electrical power supply source 128, and the timer 178. The controller 180 is configured to receive the input signals correspondingly upon the actuation of the input interfaces 196. For example, the controller 180 may receive: the first signal upon the actuation of the first input interface 268 via the second communication line 288; the second input signal upon the actuation of the second input interface 272 via the second communication line 292; and the third input signal upon the actuation of the third input interface 276 via the second communication line 296.

In response to the input signals received, the controller 180 is configured to control the supply of the electric power from the electrical power supply source 128 to the lighting unit 200'. For instance, upon receipt of the first input signal, the controller 180 may control the timer 178 to operate in the second operating mode to facilitate the supply of electric power from the electrical power supply source 128 to the lighting unit 200'. In addition, the controller 180 may receive the measured elapsed time accumulated from the actuation of the first input interface 268 (or accumulated from receipt of the first input signal), from the timer 178.

In response to the receipt of the measured elapsed time from the timer 178, the controller 180 may be configured to compare the measured elapsed time with a threshold cut-off time prestored in a memory 308 of the controller 180. In an example, the threshold cut-off time is 40 seconds. When the measured elapsed time becomes equal to or greater than the threshold cut-off time, the controller 180 may control the timer 178 to switch from the second operating mode to the first operating mode to cut-off the supply of electric power from the electrical power supply source 128 to the lighting unit 200'.

The controller 180 may be associated with the machine 100. In the present embodiment, the controller 180 is housed within the machine 100. It should be noted that, in other embodiments, the controller 180 may be housed within the body 184 of the tool 176. The controller 180 may include a processor 312 to process a variety of data (or inputs) such as the input signals received upon the actuation of the input interfaces 196, the measured elapsed time received from the timer 178, and the like. Examples of the processor 312 may include, but are not limited to, an X86 processor, a Reduced Instruction Set Computing (RISC) processor, an Application Specific Integrated Circuit (ASIC) processor, a Complex Instruction Set Computing (CISC) processor, an Advanced RISC Machine (ARM) processor, or any other processor.

Further, the controller 180 may include a transceiver 316. According to various embodiments of the present disclosure, the transceiver 316 may enable the controller 180 to communicate (e.g., wirelessly) with the first hydraulic pump 134, the second hydraulic pump 134', the timer 178, etc., over one or more of wireless radio links, infrared communication links, short wavelength Ultra-high frequency radio waves, short-range high frequency waves, or the like. Example transceivers may include, but are not limited to, wireless personal area network (WPAN) radios compliant with various IEEE 802.15 (Bluetooth™) standards, wireless local area network (WLAN) radios compliant with any of the various IEEE 802.11 (WiFi™) standards, wireless wide area network (WWAN) radios for cellular phone communication, wireless metropolitan area network (WMAN) radios compliant with various IEEE 802.15 (WiMAX™) standards, and wired local area network (LAN) Ethernet transceivers for network data communication.

Examples of the memory 308 may include a hard disk drive (HDD), and a secure digital (SD) card. Further, the memory 308 may include non-volatile/volatile memory units such as a random-access memory (RAM)/a read only memory (ROM), which may include associated input and output buses. The memory 308 may be configured to store various other instruction sets for various other functions of the machine 100, along with the set of instruction, discussed above.

INDUSTRIAL APPLICABILITY

With reference to FIGS. 1, 2, 3, and 4, an exemplary method of removing a worn-out cutting bit, i.e., removing the cutting bit 164' from the rotor 160 of the machine 100, is discussed. Initially, the operator may switch the machine 100 into a service mode. In the service mode, at least one of the forward wall 154, the aft wall 158, and/or gates of the milling chamber 152, may be opened for accessing the rotor assembly 156 of the machine 100.

Next, the operator may connect the tool 176 to the hydraulic power source 132 of the machine 100, e.g., to the second hydraulic pump 134', via the first coupling 192 (or the hydraulic connector 192') and the hydraulic hose 264. In addition, the operator may connect the tool 176 to the electrical power supply source 128 and the controller 180 of the machine 100, e.g., to the battery pack 128' of the machine 100, via the second coupling 212 (or the 12-pin electrical connector 212') and an electrical cord 320 (shown in FIGS. 3 and 4) including the first power supply line 206 and the second power supply line 206' of the first communication line 204, the third communication lines 300, and the fourth communication lines 304. At this stage, the timer 178 is at the first operating mode. Accordingly, the timer 178 may prevent any supply of electric power from the electrical power supply source 128 to the lighting unit 200', and hence, the lighting unit 200' is in a de-activated state.

To clearly view, inspect, (and/or identify) the cutting bit 164' to be removed from the rotor 160 (housed in the dimly lit inside region of the milling chamber 152), and to efficiently and safely perform the removal of the cutting bit 164', the operator may desire to activate the lighting unit 200' of the tool 176. In this regard, the operator may actuate the second input interface 272 or the third input interface 276, and correspondingly communicate the second input signal (for rotating the rotor assembly 156 in the clockwise direction) or the third input signal (for rotating the rotor assembly 156 in the counterclockwise direction) to the controller 180, via the second communication line 288 or the second communication line 292, respectively.

In response to the receipt of the second input signal or the third input signal, the controller 180 may control the timer 178 to switch from the first operating mode to the second operating mode to permit the supply of electric power from the electrical power supply source 128 to the lighting unit 200', via the first communication line 204. Upon receipt of the electric power from the electrical power supply source 128, the lighting unit 200' may be activated. Also, the controller 180 may control the first hydraulic pump 134 in a manner to correspondingly rotate the rotor assembly 156 in the clockwise direction (or the counterclockwise direction). Next, the operator may bring the tool 176 closer to the rotating rotor assembly 156 in a manner to project the light (emitted from the lighting unit 200') towards the rotor assembly 156 to identify the worn-out cutting bit 164' to be removed.

Once the rotor assembly 156 stops rotating and the worn-out cutting bit 164' (to be removed) is identified by the operator, the operator may engage the first jaw 248 of the tool 176 with the bit holder 168 to which the cutting bit 164' is mounted, and may engage the second jaw 252 of the tool 176 with the flange 260 of the cutting bit 164'. Next, the operator may commence the removal of the cutting bit 164' by actuating the first input interface 268. In response to the actuation of the first input interface 268, the controller 180 may receive the first input signal, via the second communication line 288. Upon receipt of the first input signal, the controller 180 may control the second hydraulic pump 134' (of the hydraulic power source 132) in a manner to cause the actuator 256 (of the extraction mechanism 188) to move the second jaw 252 relative to the first jaw 248, for example, away from the first jaw 248 towards the second, actuated position. Said movement of the second jaw 252 causes the cutting bit 164' to be drawn out of and removed from the bit holder 168 on the rotor 160 of the machine 100. Once the cutting bit 164' is drawn out from the bit holder 168, the second jaw 252 may return to the first, spring biased, position, releasing the worn cutting bit 164' so that it can be discarded or reworked.

In some embodiments, the timer 178 may start to measure the time elapsed from the actuation of either the second input interface 272 or the third input interface 276, and may communicate the measured elapsed time to the controller 180. The controller 180 may compare the measured elapsed time, received from the timer 178, with the threshold cut-off time prestored in the memory 308 of the controller 180. Once the measured elapsed time becomes equal to or greater than the threshold cut-off time, the controller 180 may control the timer 178 to switch from the second operating mode to the first operating mode to cut-off the supply of electric power from the electrical power supply source 128 to the lighting unit 200', and hence, de-activate the lighting unit 200'. It should be noted that in order to begin the removal of another worn-out cutting bit, the operator may re-activate the lighting unit 200' by again actuating the one or more input interfaces 196.

Additionally, in another exemplary method of activating the lighting unit 200' prior to performing the removal of the cutting bit 164', the operator may actuate the first input interface 268. Upon the actuation of the first input interface 268, the controller 180 may receive the first input signal, via the second communication line 288. In response to the receipt of the first input signal, the controller 180 may control the timer 178 to switch from the first operating mode to the second operating mode to permit the supply of electric power from the electrical power supply source 128 to the lighting unit 200', via the first communication line 204. Upon receipt of the electric power from the electrical power supply source 128, the lighting unit 200' may be activated. Simultaneously, the controller 180 may control the second hydraulic pump 134' to cause the actuator 256 (of the extraction mechanism 188) to move the second jaw 252 from the first, spring biased, position (close to the first jaw 248), to the second, actuated, position (away from the first jaw 248), and back to the first, spring biased, position. Once the lighting unit 200' is activated and the second jaw 252 is returned to its first, spring biased, position, the operator may use the tool 176 for performing the removal of the cutting bit 164', as discussed above.

The tool 176 may be applicable to any milling machine, such as a cold planer, a rotary mixer, a mulcher, or other machinery involving a rotor assembly having cutting bits which require removal and replacement. The tool 176 provides better visibility to the operator when performing the removal of the cutting bit from the rotor assembly. Accordingly, the tool 176 helps the operator to perform the removal of the cutting bits safely and efficiently. Further, by facilitating the automatic activation of the lighting unit upon the actuation of at least one input interface 196, the tool 176 eliminates an additional step of turning on the lighting unit (e.g., by way of an altogether different input device) before using the tool for removing the worn-out cutting bits, thus saving time and effort. Furthermore, the tool 176 does not require any dedicated power source (or battery) as it may be powered from the electrical power supply source 128 of the machine 100, and accordingly, the tool can be made compact and lightweight for portability and repeated use.

Unless explicitly excluded, the use of the singular to describe a component, structure, or operation does not exclude the use of plural such components, structures, or operations or their equivalents. The use of the terms "a" and "an" and "the" and "at least one" or the term "one or more," and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B" or one or more of A and B") is to be construed to mean one item selected from the listed items (A or B) or any combination of two or more of the listed items (A and B; A, A and B; A, B and B), unless otherwise indicated herein or clearly contradicted by context. Similarly, as used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

It will be apparent to those skilled in the art that various modifications and variations can be made to the tool, the tool system, and the machine of the present disclosure without departing from the scope of the disclosure. Other embodiments will be apparent to those skilled in the art from consideration of the specification and practice of the bracket assembly disclosed herein. It is intended that the specification and examples be considered as exemplary only, with a true scope of the disclosure being indicated by the following claims and their equivalent.

What is claimed is:

1. A tool for removing a cutting bit from a rotor of a rotor assembly of a machine, the tool comprising:

one or more input interfaces configured to be actuated to perform one or more functions associated with removing the cutting bit from the rotor, the one or more input interfaces including:

a second input interface configured to be actuated to perform a second function of the one or more functions, wherein the second function includes a clockwise rotation of the rotor; and a third input interface configured to be actuated to perform a third function of the one or more functions, wherein the third function includes a counterclockwise rotation of the rotor; and one or more lighting units configured to be activated upon the actuation of the one or more input interfaces to illuminate at least a portion of the rotor assembly when performing the one or more functions associated with removing the cutting bit from the rotor.

2. The tool of claim 1 further comprising a first communication line configured to operatively connect the one or more lighting units with an electrical power supply source of the machine, wherein the activation of the one or more lighting units is caused by a supply of electric power from the electrical power supply source to the one or more lighting units through the first communication line upon the actuation of the one or more input interfaces.

3. The tool of claim 1 further comprising one or more second communication lines configured to operatively and correspondingly connect the one or more input interfaces with an electrical power supply source of the machine and a controller of the machine, wherein the one or more functions are performed based on one or more input signals received by the controller through the one or more second communication lines upon the actuation of the associated one or more input interfaces.

4. The tool of claim 1, wherein the one or more input interfaces include a first input interface configured to be actuated to perform a first function of the one or more functions, and wherein the first function includes an extraction of the cutting bit from the rotor.

5. The tool of claim 4 further comprising an extraction mechanism configured to extract the cutting bit from the rotor upon the actuation of the first input interface, wherein the extraction mechanism is powered by a hydraulic power source of the machine.

6. A tool system for a machine having a rotor assembly including a rotor and a plurality of cutting bits mounted to the rotor, the tool system comprising:

a tool for removing a selected cutting bit of the plurality of cutting bits from the rotor, the tool including:

one or more input interfaces configured to be actuated to perform one or more functions associated with removing the selected cutting bit from the rotor, the one or more input interfaces including:

a second input interface configured to be actuated to perform a second function of the one or more functions, wherein the second function includes a clockwise rotation of the rotor; and a third input interface configured to be actuated to perform a third function of the one or more functions, wherein the third function includes a counterclockwise rotation of the rotor; and one or more lighting units configured to be activated upon the actuation of the one or more input interfaces to illuminate at least a portion of the rotor assembly when performing the one or more functions associated with removing the selected cutting bit from the rotor;

a controller configured to:

receive one or more input signals correspondingly upon the actuation of the one or more input interfaces; and control, in response to the one or more input signals, a supply of electric power from an electrical power supply source of the machine to the one or more lighting units to activate the one or more lighting units.

7. The tool system of claim 6, wherein the tool includes a first communication line configured to operatively connect the one or more lighting units with the electrical power supply source of the machine, wherein the activation of the one or more lighting units is caused by the supply of electric power from the electrical power supply source to the one or more lighting units through the first communication line upon the actuation of the one or more input interfaces.

8. The tool system of claim 6, wherein the tool includes one or more second communication lines configured to operatively and correspondingly connect the one or more input interfaces with the electrical power supply source of the machine and the controller, wherein the one or more functions are performed based on the one or more input signals received by the controller through the one or more second communication lines upon the actuation of the associated one or more input interfaces.

9. The tool system of claim 6 further comprising a timer configured to measure an elapsed time accumulated from the actuation of the one or more input interfaces, wherein:

the controller is in communication with the timer; and the controller is configured to cut-off the supply of electric power from the electrical power supply source of the machine to the one or more lighting units when the elapsed time is equal to or greater than a threshold cut-off time.

10. The tool system of claim 6, wherein the one or more input interfaces include a first input interface configured to be actuated to perform a first function of the one or more functions, and wherein the first function includes an extraction of the selected cutting bit from the rotor.

11. The tool system of claim 10, wherein the tool includes an extraction mechanism configured to extract the selected cutting bit from the rotor upon the actuation of the first input interface, and wherein the extraction mechanism is powered by a hydraulic power source of the machine.

12. A machine, comprising:

a milling chamber;

a rotor assembly housed within the milling chamber, the rotor assembly including a rotor and a plurality of cutting bits to mill a ground surface beneath the machine; and a tool system including:

a tool for removing a selected cutting bit of the plurality of cutting bits from the rotor, the tool including:

one or more input interfaces configured to be actuated to perform one or more functions associated with removing the selected cutting bit from the rotor, the one or more input interfaces including:

a second input interface configured to be actuated to perform a second function of the one or more functions, wherein the second function includes a clockwise rotation of the rotor; and a third input interface configured to be actuated to perform a third function of the one or more functions, wherein the third function includes a counterclockwise rotation of the rotor; and one or more lighting units configured to be activated upon the actuation of the one or more input interfaces to illuminate at least a portion of the rotor assembly when performing the one or more functions associated with removing the selected cutting bit from the rotor;

a controller configured to:

receive one or more input signals correspondingly upon the actuation of the one or more input interfaces; and control, in response to the one or more input signals, a supply of electric power from an electrical power supply source of the machine to the one or more lighting units to activate the one or more lighting units.

13. The machine of claim 12, wherein the tool includes a first communication line configured to operatively connect the one or more lighting units with the electrical power supply source of the machine, wherein the activation of the one or more lighting units is caused by the supply of electric power from the electrical power supply source to the one or more lighting units through the first communication line upon the actuation of the one or more input interfaces.

14. The machine of claim 12, wherein the tool includes one or more second communication lines configured to operatively and correspondingly connect the one or more input interfaces with the electrical power supply source of the machine and the controller, wherein the one or more functions are performed based on the one or more input signals received by the controller through the one or more second communication lines upon the actuation of the associated one or more input interfaces.

15. The machine of claim 12, wherein the tool system includes a timer configured to measure an elapsed time accumulated from the actuation of the one or more input interfaces, wherein:

the controller is in communication with the timer; and the controller is configured to cut-off the supply of electric power from the electrical power supply source of the machine to the one or more lighting units when the elapsed time is equal to or greater than a threshold cut-off time.

16. The machine of claim 12, wherein the one or more input interfaces include a first input interface configured to be actuated to perform a first function of the one or more functions, and wherein the first function includes an extraction of the selected cutting bit from the rotor.

17. The machine of claim 16, wherein the tool includes an extraction mechanism configured to extract the selected cutting bit from the rotor upon the actuation of the first input interface, and wherein the extraction mechanism is powered by a hydraulic power source of the machine.

* * * * *